(12) United States Patent
Hattori et al.

(10) Patent No.: US 8,694,202 B2
(45) Date of Patent: Apr. 8, 2014

(54) INFORMATION PROVIDING SYSTEM OF MOTORCYCLE

(75) Inventors: Makoto Hattori, Wako (JP); Katsuhisa Yamada, Wako (JP); Masakuni Ando, Wako (JP); Shohei Suzuki, Wako (JP); Koji Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 13/043,496

(22) Filed: Mar. 9, 2011

(65) Prior Publication Data

US 2011/0246024 A1    Oct. 6, 2011

(30) Foreign Application Priority Data

Mar. 31, 2010 (JP) ................................. 2010-082510

(51) Int. Cl.
*G06F 7/00* (2006.01)

(52) U.S. Cl.
USPC ............... 701/36; 701/444; 381/86; 381/389; 224/413

(58) Field of Classification Search
USPC ............. 701/36, 444; 348/113, 118; 381/300, 381/302, 86, 389; 224/413
See application file for complete search history.

(56) References Cited

U.S. PATENT DOCUMENTS

| 4,915,187 | A   | * | 4/1990  | Nakashima et al. | 180/219 |
| 7,397,405 | B2  | * | 7/2008  | Yamada et al.    | 341/143 |
| 8,270,640 | B1  | * | 9/2012  | Barnes           | 381/302 |
| 2005/0100173 | A1 | * | 5/2005  | Eid et al.       | 381/86 |
| 2005/0265566 | A1 | * | 12/2005 | Suzuki et al.    | 381/302 |
| 2005/0267674 | A1 | * | 12/2005 | Suzuki et al.    | 701/200 |
| 2007/0035420 | A1 | * | 2/2007  | Yamada et al.    | 341/50 |

FOREIGN PATENT DOCUMENTS

| EP | 1530400 A1 | * | 5/2005 | ............... H04R 3/04 |
| JP | 2005-343227 |   | 12/2005 | |

* cited by examiner

*Primary Examiner* — Khoi Tran
*Assistant Examiner* — Jaime Figueroa
(74) *Attorney, Agent, or Firm* — Ditthavong Mori & Steiner, P.C.

(57) ABSTRACT

An information providing system of a motorcycle includes a navigation device and an audio device. The navigation device includes a navigation controller. The navigation controller is disposed in a trunk on a side surface of the trunk close to a back surface of a passenger seat. The trunk is provided in a rear portion of a vehicle body of the motorcycle and above a rear wheel of the motorcycle. The audio device includes an audio device operation part and an audio device controller. The audio device operation part is provided in a vicinity of a handlebar of the motorcycle. The audio device controller is disposed in an audio device housing provided at a position lower than a bottom plate of the trunk.

14 Claims, 6 Drawing Sheets

INFORMATION PROVIDING SYSTEM OF MOTORCYCLE

CROSS-REFERENCE TO RELATED APPLICATIONS

The present application claims priority under 35 U.S.C. §119 to Japanese Patent Application No. 2010-082510, filed Mar. 31, 2010. The contents of this application are incorporated herein by reference in their entirety.

BACKGROUND OF THE INVENTION

1. Field of the Invention

The present invention relates to an information providing system of a motorcycle.

2. Discussion of the Background

Conventionally, various types of navigation systems are proposed as a system which provides an occupant on a motorcycle with a route to a destination and a current position of the vehicle (For example, see Japanese Patent Application Publication No. 2005-343227 (FIG. 2 and FIG. 12)).

As shown in FIG. 2 of Japanese Patent Application Publication No. 2005-343227, a navigation system of a motorcycle (10) (the number in parentheses indicates a reference numeral used in Japanese Patent Application Publication No. 2005-343227. The same applies heretofore) is formed of a control unit (hereinafter referred to as a navigation controller) (103) housed in a trunk box (39) provided in a vehicle rear portion, a navigation display part (101) disposed in a meter panel provided in a vehicle front portion, and an operation part (102) disposed on a handlebar (15) and in an upper panel (104) in a divided manner.

In addition, an audio device (60) is connected to the navigation controller (103) via wires. The audio device (60) is formed of: a component having functions of a tuner, a compact disc (hereinafter referred to as CD) player, an amplifying unit, and the like; and multiple speakers provided in the vehicle front portion and the vehicle rear portion. As shown in FIG. 12 of Japanese Patent Application Publication No. 2005-343227, the component (69) of the audio device is disposed on the seat side of the meter panel.

Since the component (69) of the audio device is disposed in the vehicle front portion for an occupant to easily operate, wires for communication with the navigation controller disposed in the vehicle rear portion may become long. Thus, the wiring may be complicated or may easily pick up noise.

Moreover, since the component (69) is disposed in a small space around a meter display part (58), the arrangement of the component (69) has to be determined with careful consideration to interference with other components.

Moreover, since the component (69) is relatively heavy, consideration has to be made on the weight balance of the vehicle when the component (69) is disposed in the vehicle front portion.

SUMMARY OF THE INVENTION

According to one aspect of the present invention, an information providing system of a motorcycle includes a navigation device and an audio device. The navigation device includes a navigation controller. The navigation controller is disposed in a trunk on a side surface of the trunk close to a back surface of a passenger seat. The trunk is provided in a rear portion of a vehicle body of the motorcycle and above a rear wheel of the motorcycle. The audio device includes an audio device operation part and an audio device controller. The audio device operation part is provided in a vicinity of a handlebar of the motorcycle. The audio device controller is disposed in an audio device housing provided at a position lower than a bottom plate of the trunk.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
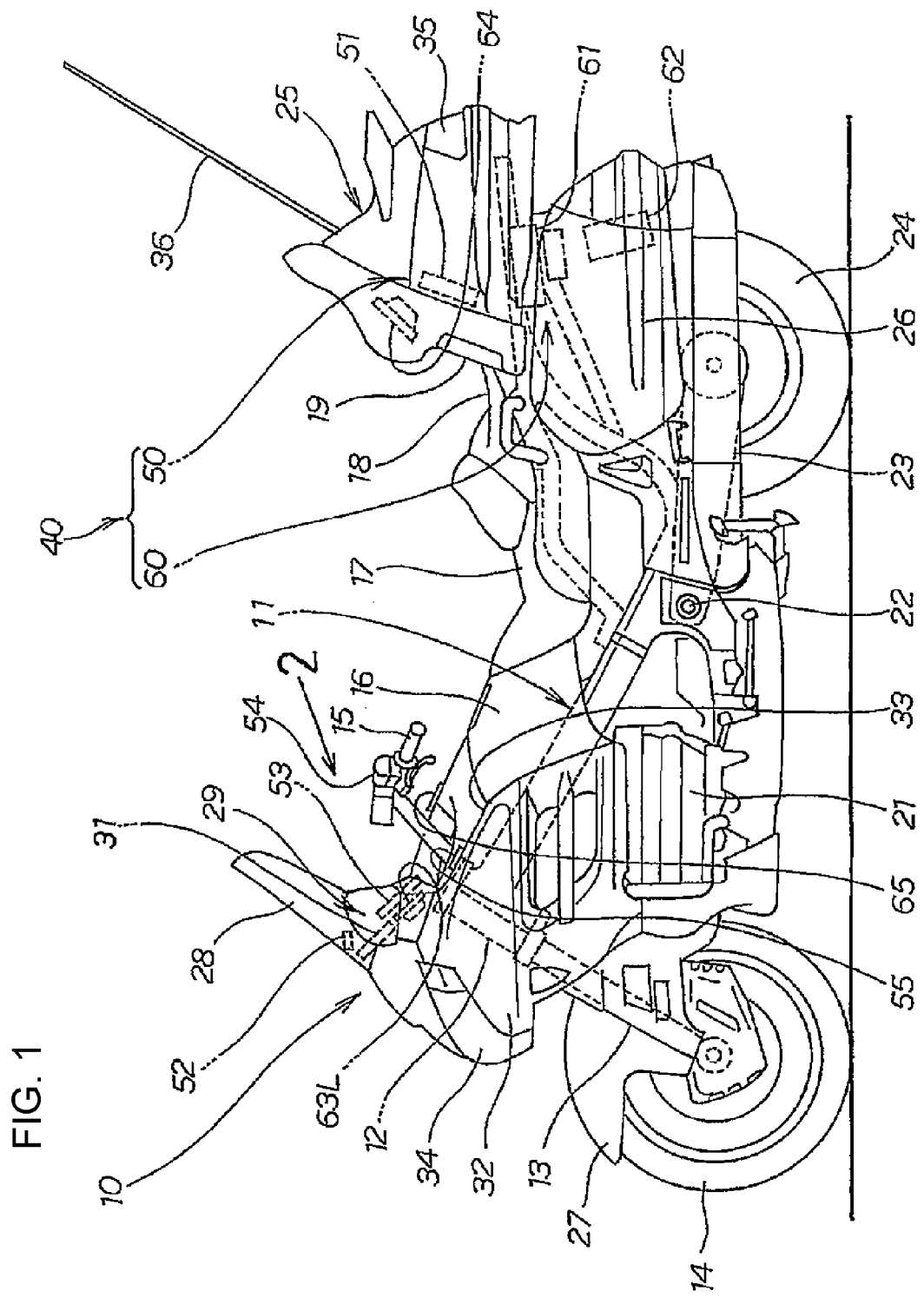
FIG. 1 is a left-side view of a motorcycle according to an embodiment of the present invention.

The embodiments of the present invention will be described below based on the attached drawings, wherein like reference numerals designate corresponding or identical elements throughout the various drawings. Note that, the drawings are to be viewed in a direction in which reference numerals can be read properly. Furthermore, front, rear, right, and left, which are used in the description below, are determined based on an occupant sitting on the seat.

The embodiment of the present invention will be described based on the drawings.

As shown in FIG. 1, a motorcycle 10 is a vehicle with the following configuration. A front fork 13 is steerably attached to a head pipe 12 of a vehicle body frame 11. A front wheel 14 is attached to a lower portion of the front fork 13, and a handlebar 15 operated by a rider is provided at an upper portion of the front fork 13. On the vehicle body frame 11, a fuel tank 16, a rider seat 17, a pillion seat 18, a backrest part 19 are provided in this order from the rear of the handle 15 in the vehicle. An engine 21 is disposed below the vehicle body frame 11. A swing arm 23 extends from a rear-lower portion of the vehicle body frame 11 with a pivot shaft 22 attached in between. The swing arm 23 is provided with a rear wheel 24, and the rear wheel 24 is driven by the engine 21. A trunk box 25 is disposed on a rear end portion of the vehicle body frame 11, above the rear wheel 24. Saddle bags 26 are attached to sides of a rear portion of the vehicle body frame 11, respectively.

Note that, the front fork 13 is provided with a front fender 27, a shield 28 is disposed frontward of the handlebar 15, a meter panel 29 is disposed rearward of the shield 28, a meter display part 31 is provided in the meter panel 29, a front cowl 32 is disposed frontward of the fuel tank 16, an upper panel 33 is provided on an upper portion of the front cowl 32, and a head light 34 is attached to the front cowl 32. Furthermore, a tail lamp 35 is attached to a rear end of the trunk box 25, and a rod antenna 36 is attached to the trunk box 25.

In addition, the motorcycle 10 includes an information providing system 40 which provides multiple pieces of information to an occupant. The information providing system 40 is configured of a navigation device 50 (described later in detail) and an audio device 60 (described later in detail). Information provided by the information providing system 40 refers to information such as: information on a route to a destination, a current position of the vehicle, and the like provided by the navigation device 50; and music, audio from a radio, and the like provided by the audio device 60. Next, a configuration of the navigation device 50 will be described.

The navigation device 50 is formed of a navigation controller 51 (described later in detail) disposed in the trunk box 25, a global positioning system (hereinafter, referred to as GPS) antenna 52 provided on the meter panel 29, a navigation display part 53 disposed rearward of the meter display part 31, a handlebar navigation operation part 54 provided on the handlebar 15, and a panel navigation operation part 55 disposed in the upper panel 33.

The GPS antenna 52, the navigation display part 53, the handlebar navigation operation part 54, and the panel navigation operation part 55 are connected to the navigation controller 51 by wires. Next, a configuration of the audio device 60 will be described.

In the audio device 60, an audio device operation part 65 (described later in detail) and an audio device controller 61 (described later in detail) are formed separately. The audio device operation part 65 is provided near the handlebar 15, and the audio device controller 61 is disposed below the trunk box 25. Furthermore, an amplifying unit 62 (described later in detail) is disposed below the audio device controller 61.

In addition, a left front speaker 63L (right front speaker will be described later) is provided in the meter panel 29, and rear speakers 64 are provided in the backrest part 19. The left front speaker 63L and the rear speakers 64 are connected to the amplifying unit 62 and the audio device controller 61 by wires, and the audio device operation part 65 is connected to the audio device controller 61 by wires.

Note that, the audio device controller 61 is an apparatus formed by integrating a tuner, a CD player, and the like, and is also an apparatus including an equalizer and a digital signal processor. Next, the arrangement of the audio device operation part 65 in the meter panel 29 will be described with reference to FIG. 2.

Figure 2:
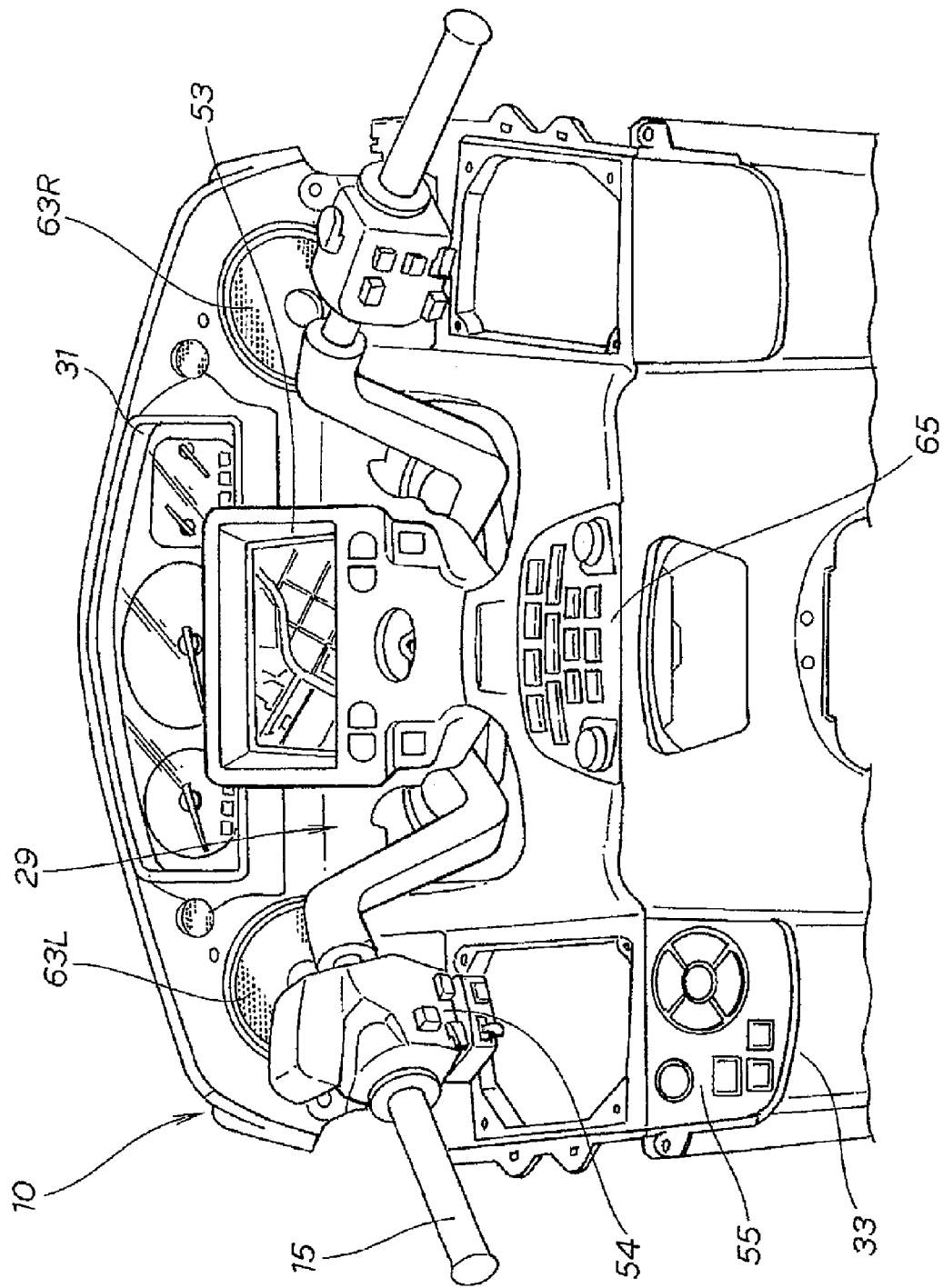
FIG. 2 is a view seen in a direction of an arrow 2 in FIG. 1.

As shown in FIG. 2, the audio device operation part 65 is disposed on the seat (reference numeral 17 in FIG. 1) side of the meter panel 29. The audio device operation part 65 is provided near the handlebar 15, the handlebar navigation operation part 54 is provided on the handlebar 15, and the panel navigation operation part 55 is disposed in the upper panel 33. This configuration makes the operations of the audio device and the navigation device easy. Note that, a right front speaker 63R is provided on the right side of the meter panel 29. Next, the arrangement structure of the navigation controller (reference numeral 51 in FIG. 1), the audio device controller (reference numeral 61 in FIG. 1), and the amplifying unit (reference numeral 62 in FIG. 1) will be described in detail with reference to FIG. 3.

Figure 3:
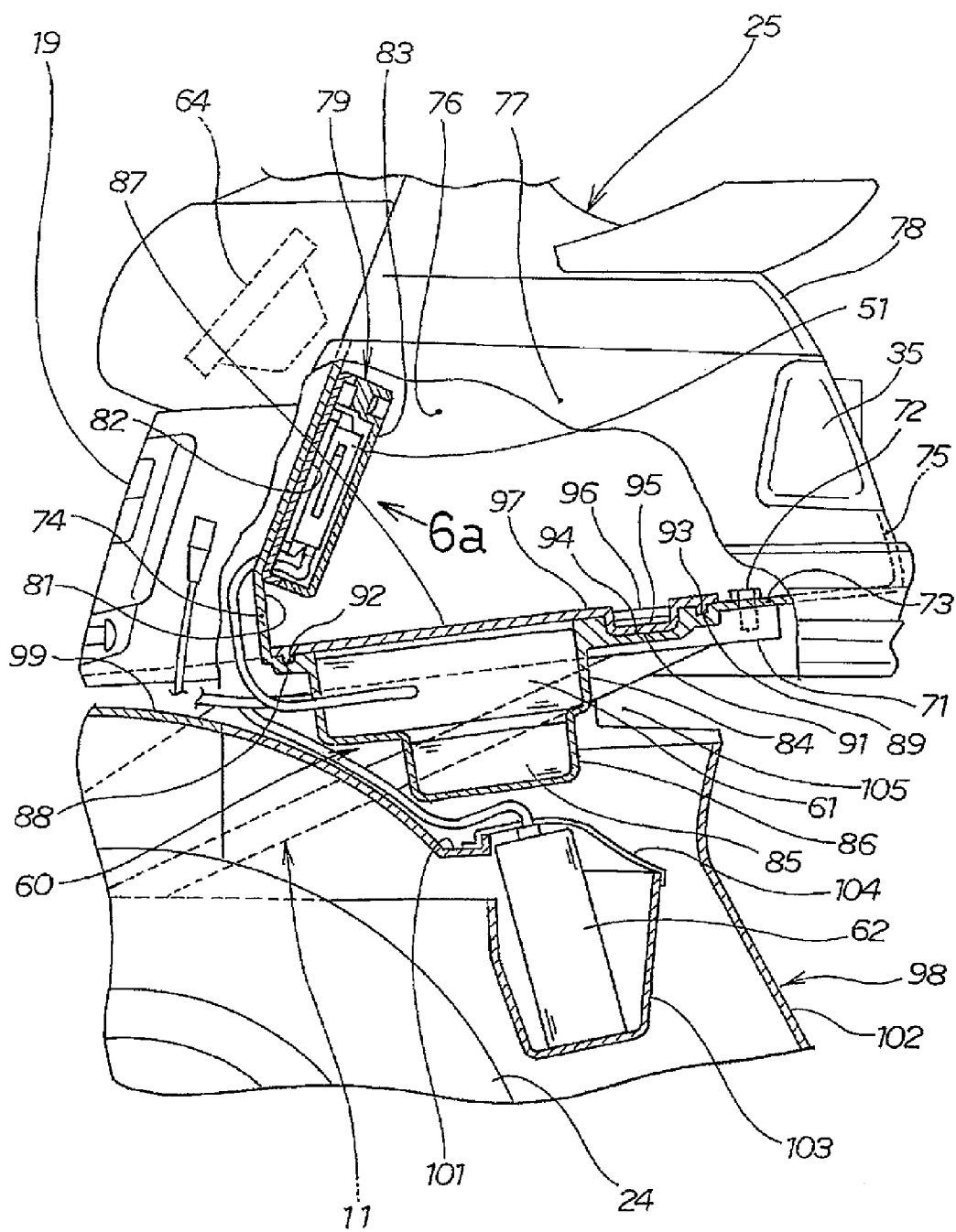
FIG. 3 is a cross-sectional view of main portions of a trunk and a rear fender.

As shown in FIG. 3, the trunk box 25 is attached to a rear portion of a seat rail 71 of the vehicle body frame 11 with a bolt 72. Moreover, the trunk box 25 is formed of a bottom plate 73 disposed on the seat rail 71, a front plate 74 extending upward from the front end of the bottom plate 73, a rear plate 75 extending upward from the rear end of the bottom plate 73, a right plate 76, a left plate 77, and a trunk lid 78 openably and closably attached to the front plate 74 by a hinge. The trunk box 25 has a secured waterproofness.

The navigation controller 51 is housed inside a navigation controller case 79, and the navigation controller case 79 is detachably attached to a front-plate inner surface 81, in the trunk box 25, close to the back surface of the pillion seat (reference numeral 18 in FIG. 1). Moreover, the navigation controller case 79 is formed of a navigation controller attachment base 82 to which the navigation controller 51 is attached, and a navigation controller cover 83 which is openably and closably provided on the navigation controller attachment base 82 to cover the navigation controller 51.

Accordingly, the maintenance of the navigation controller 51 can be performed when the maintenance of the navigation controller 51 is needed, by detaching the navigation controller case 79 from the trunk box 25, and then opening the navigation controller cover 83 of the navigation controller case 79.

The audio device controller 61 is disposed in an audio device housing part 84 which is provided at a position lower than the bottom plate 73 of the trunk box 25 and extends downward from the bottom plate 73. In addition, a radio unit 85 is disposed in a radio unit housing part 86 which is provided below the audio device housing part 84 and extends downward from the audio device housing part 84.

A part of the bottom plate 73 of the trunk box 25 is a maintenance lid 87 which can be opened and closed to be used for the maintenance of the audio device controller 61. The lid 87 has a front-end projecting portion 88 at the front end of the lower surface, a rear-end projecting portion 89 at the rear end of the lower surface, and an middle projecting portion 91 in front of the rear-end projecting portion 89.

The front-end projecting portion 88, the rear-end projecting portion 89, and the middle projecting portion 91 are fitted into a front-end recess portion 92, a rear-end recess portion 93, and a middle recess portion 94 provided in the bottom plate 73, respectively. Thus, the movement of the maintenance lid 87 is regulated. Moreover, an upper-side recess portion 95 is provided on the upper side of the middle projecting portion 91 of the maintenance lid 87, and a handle 96 is provided in the upper-side recess portion 95. The handle 96 is provided at a position lower than an upper surface 97 of the maintenance lid 87. This configuration prevents posing a limitation on the luggage space, when luggage is loaded into the trunk box 25.

The maintenance lid 87 serves as a bottom plate supporting luggage when the luggage is loaded into the trunk box 25, and is a member which is detached from the bottom plate 73 of the trunk box 25 when the maintenance of the audio device controller 61 is required. Since only the opening of the maintenance lid 87 is required when the maintenance is preformed, the maintenance of the audio device controller 61 can be performed easily, and the operability is further improved.

Note that, the maintenance lid 87 in the embodiment is a fitting type using the projecting portions and the recess portions. However, the maintenance lid 87 may be a hinge type using a hinge. Alternatively, the maintenance lid 87 may be a sliding type in which the lid is made to slide by using a supporting member such as a rail.

In addition, a rear fender 98 is disposed below the trunk box 25. The rear fender 98 is formed of: a rear-fender front portion 99 which is disposed on the front side and covers the rear wheel 24; a rear-fender middle portion 101 which is disposed in the middle and covers the rear side of the rear wheel 24; and a rear-fender rear portion 102 which is disposed on the rear side and covers the rear-fender middle portion 101.

The amplifying unit 62 is disposed in an amplifying-unit housing part 103 which is disposed below the audio device controller 61 and is provided in the rear-fender middle portion 101. Note that, the amplifying unit 62 is covered with a rubber cover 104 attached to the amplifying-unit housing part 103.

In the audio device 60, the audio device controller 61 and the amplifying unit 62 can be arranged independently from each other. Freedom in arrangement of the audio device controller 61 and the amplifying unit 62 can be improved more than that in a case where the audio device controller and the amplifying unit are integrated. Moreover, the amplifying unit 62 is an element including a heat generating part. The heat radiation effect on the amplifying unit 62, however, can be expected since the amplifying-unit housing part 103 is positioned at a rear end portion of the motorcycle (reference numeral 10 in FIG. 1), which is a portion cooled relatively well by an effect of traveling wind.

The audio device housing part 84 is disposed in an open space 105 between the bottom plate 73 of the trunk box 25 and the rear wheel 24 while maintaining easy operation of the audio device operation part (reference numeral 65 in FIG. 2). By effectively using the open space 105, the audio device controller 61 and the audio device operation part can be disposed at optimum positions without the need for making consideration on interference of other components with the audio device controller 61 and the audio device operation part.

Furthermore, fewer devices are disposed in a vehicle body front portion, compared to a case where the audio device housing part 84 is disposed at a position in the vehicle body front portion which includes the meters and the like. Thus, the weight balance of the entire motorcycle (reference numeral 10 in FIG. 1) is improved.

In addition, the navigation controller 51 is disposed in the trunk box 25, the audio device controller 61 is disposed in the audio device housing part 84, and the amplifying unit 62 is disposed in the amplifying-unit housing part 103. Accordingly, there is no need to consider of making the cases of the navigation controller and the audio device waterproof. In addition, there is no need to consider of making harnesses and connectors to be connected to the navigation controller and the audio device controller waterproof. Accordingly, the cost of the information providing system (reference numeral 40 in FIG. 1) can be reduced compared to a case where the navigation controller 51 and the audio device controller 61 are made waterproof.

Moreover, the navigation controller 51 and the audio device controller 61 are disposed close to each other. The wire connecting the navigation controller 51 and the audio device controller 61 is made shorter and is less likely to be affected by noise than the wire of the case where the audio device controller 61 is provided in the vehicle body front portion. Thus, improvement in sound quality can be expected. In addition, no complicated wiring is required, and reduction in cost can be achieved. Next, a wire connection among the navigation controller 51, the audio device controller 61, and the amplifying unit 62 will be described with reference to FIG. 4.

Figure 4:
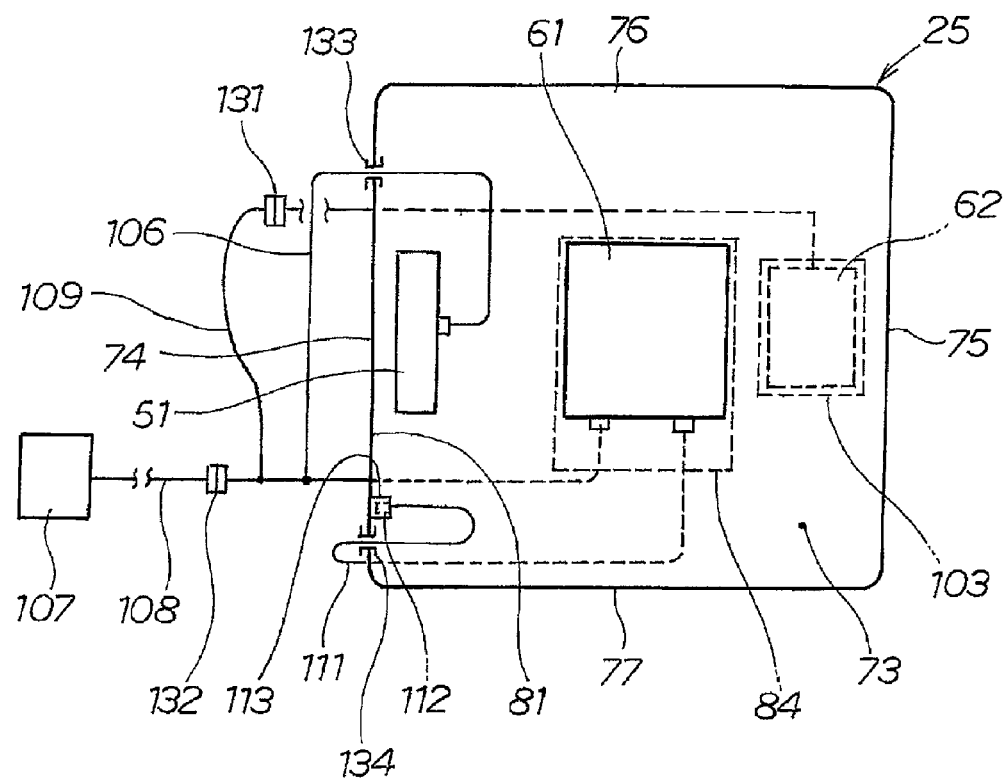
FIG. 4 is a view showing connection among a navigation controller, an audio device controller, and an amplifying unit.

FIG. 4 schematically shows the arrangement of the navigation controller 51, the audio device controller 61, and the amplifying unit 62 when the bottom plate 73 of the trunk box 25 is seen from above.

The navigation controller 51 and the audio device controller 61 are connected to each other by a communication harness 106. The communication harness 106 is pulled out of the audio device housing part 84, and then inserted into the trunk box 25. If being made to penetrate through the bottom plate of the trunk box, the communication harness will affect the luggage space in the trunk. In this respect, since the harness is not made to run through the bottom plate 73 of the trunk box 25, in the embodiment of the present invention, the storage space of the trunk box 25 can be used effectively when luggage is loaded into the trunk box 25.

A main harness 108 connected to a battery 107 is connected to the communication harness 106. The amplifying unit 62 is connected to the main harness 108 through an amplifying unit harness 109. In other words, the independent amplifying unit 62 is connected to the audio device controller 61.

Moreover, a connector harness 111 is connected to the audio device controller 61. The connector harness 111 is inserted into the trunk box 25. A universal serial bus (hereinafter referred to as USB) connector 112 (described later in detail) is further provided at the leading end of the connector harness 111. The USB connector 112 is attached to a protection cover 113 (described later in detail) provided on the front-plate inner surface 81 of the front plate 74. Next, the positional relationship between the audio device controller 61 and the communication harness 106 will be described with reference to FIG. 5.

Figure 5:
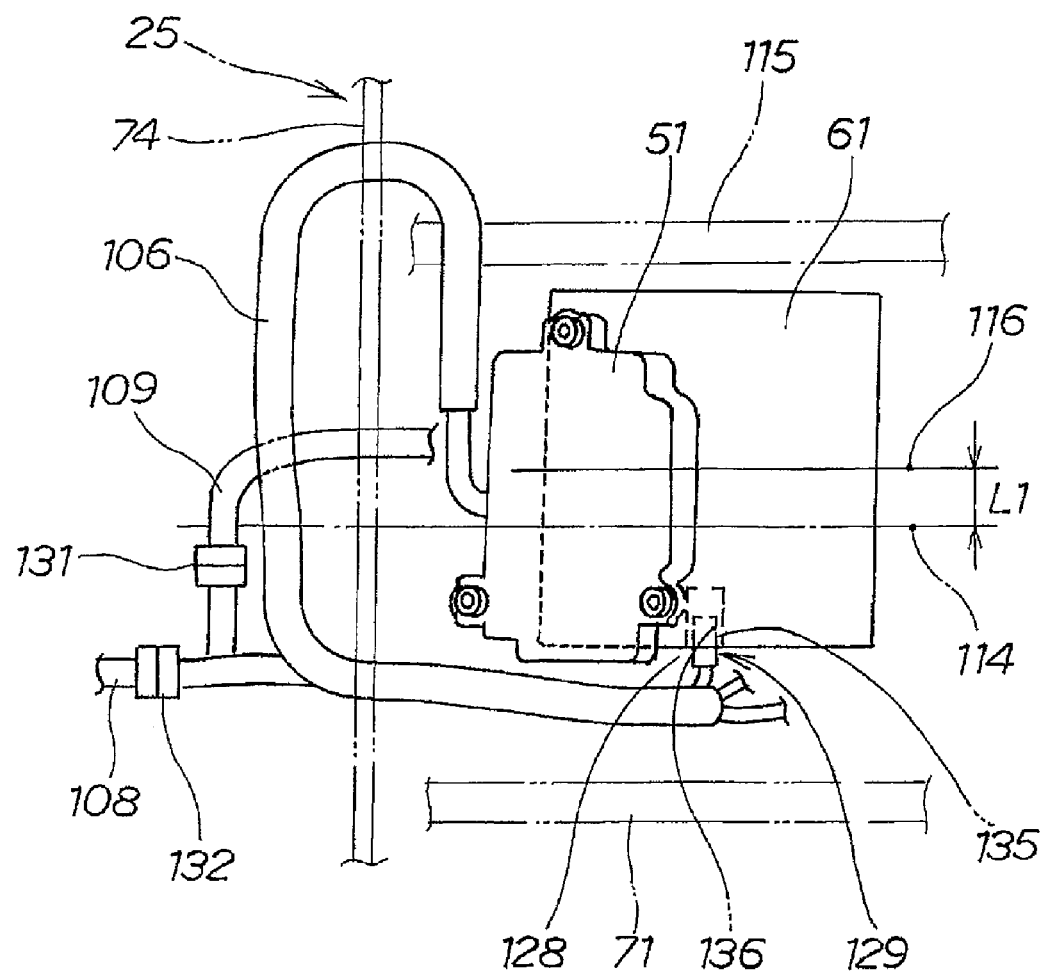
FIG. 5 is a view for explaining positional relationship between the audio device controller and a communication harness.

FIG. 5 schematically shows the arrangement of the navigation controller 51 and the audio device controller 61 when the trunk box is closed. Moreover, the left seat rail 71 is disposed on the left side of a vehicle-width center line 114 as illustrated in imaginary lines, and a right seat rail 115 is disposed on the right side of the vehicle-width center line 114 as illustrated in imaginary lines. The audio device controller 61 is disposed at a position offset by a distance L1 to the right in the vehicle width direction from the vehicle-width center line 114. A straight line 116 is the center line of the audio device controller 61.

Moreover, the communication harness 106 extending out from the navigation controller 51 is curved to the right, is pulled out of the trunk box 25, extends to a side opposite to the side where the audio device controller 61 is offset from the vehicle-width center line 114, and then inserted into the trunk box 25. The communication harness 106 inserted into the trunk box 25 is connected to the audio device controller 61.

This configuration allows the main harness 108 to be disposed on the side opposite to the side where the audio device controller 61 is offset from the vehicle-width center line 114. Since the communication harness 106 connecting the navigation controller 51 and the audio device controller 61 is disposed in such a way as to run on the main harness 108 side, the wire to connect the communication harness 106 and the main harness 108 can be handled easily. Thus, the wire can be made to run easily.

In addition, the audio device controller 61 has a connection part 129 of the wire on a space 128 side, the space 128 made by the offset. The connection part 129 is formed of a male connector 135 which is provided on the communication harness 106, and a female connector 136 to which the male connector 135 is fitted and which is provided on the audio device controller 61. Since the connection part 129 of the wire is disposed on the space 128 side, the space 128 obtained by the offset arrangement of the audio device controller 61, the insertion and removal of the male connector 135 can be performed more easily, and the operation efficiency is improved.

Note that, although the audio device controller 61 is disposed at the position offset from the vehicle-width center line 114 to the right in the vehicle width direction in the embodiment, the audio device controller 61 may be disposed at a position offset to the left in the vehicle width direction. Next, the arrangement and structure of the protection cover to which an attachment portion is integrated will be described with reference to FIGS. 6A and 6B.

Figure 6A:
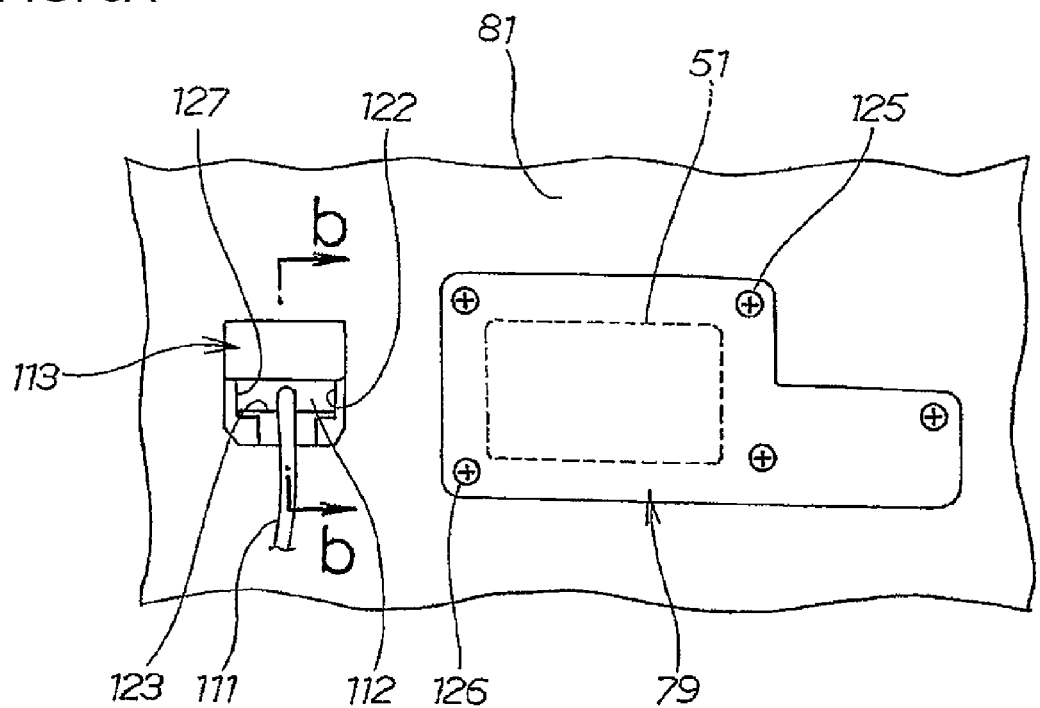
FIGS. 6A and 6B are views for explaining the structure and the arrangement of a protection cover.

FIG. 6A is a view seen in a direction of an arrow 6a in FIG. 3. The navigation controller case 79 housing the navigation controller 51 is attached to the front-plate inner surface 81 of the trunk box (reference numeral 25 in FIG. 3). The protection cover 113 to which the USB connector 112 is fitted is attached to the front-plate inner surface 81 at a position on the left side of the navigation controller case 79. In other words, the USB connector 112 is disposed in the trunk box.

Since an electronic apparatus such as a digital audio player and a CD player can be connected to the USB connector 112, the audio device (reference numeral 60 in FIG. 3) can be functionally expanded. Accordingly, the audio device can be made more entertaining and easier to operate for users such as the rider and the passenger.

Figure 6B:
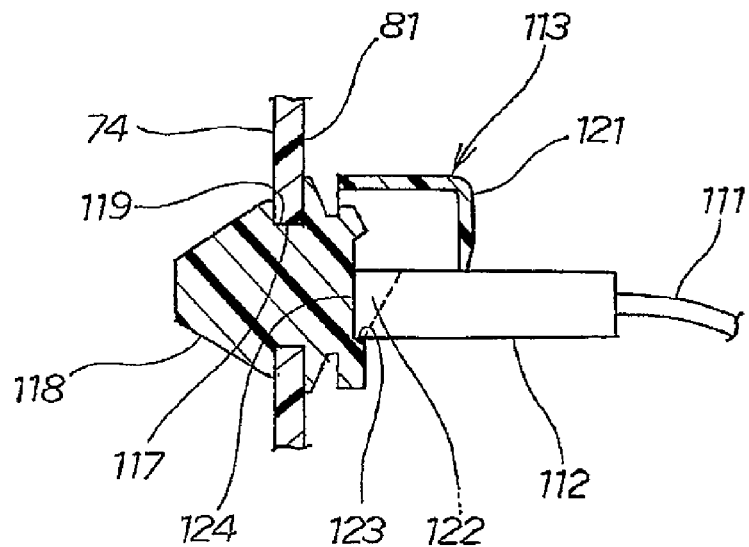

FIG. 6B is a cross-sectional view taken along a line b-b in FIG. 6A. A fitting groove 119 provided in an attachment portion 118 of the protection cover 113 is fitted into a hole 117 in the front plate 74 of the trunk box (reference numeral 25 in FIG. 3). Moreover, the USB connector 112 is in contact with a lower end of a cover portion 121, a connector contact surface 122, and an upper end of a connector supporting portion 123 of the protection cover 113. In addition, the protection cover 113 is elastic. Thus, the USB connector 112 is securely held by the protection cover 113.

In other words, a connector connection port 124 of the USB connector 112 is attached to the protection cover 113 which is integral with the attachment portion 118 attached to the front-plate inner surface 81 of the trunk box. When the trunk box is opened, rain water or dust may enter the connection port of the USB connector if a cover or a cap is not attached to the connection port of the USB connector. In the embodiment of the present invention, on the other hand, since the protection cover 113 is attached to the connector connection port 124 of the USB connector 112, a waterproofness and a dustproofness are secured even when the trunk box is opened.

Although soft resin is suitable as a material of the protection cover 113, rubber is also applicable. Moreover, although the protection cover 113 is attached to the front-plate inner surface 81 of the trunk box in the embodiment, the protection cover 113 can be also attached to any one of an inner surface of the back plate (reference numeral 75 in FIG. 3), an inner surface of the right plate (reference numeral 76 in FIG. 3), and an inner surface of the left plate (reference numeral 77 of FIG. 3).

Note that, the amplifying unit of the embodiment of the present invention is provided in the amplifying-unit housing part in the rear fender in the embodiment mode. However, a housing part may be provided at the rear end of the bottom plate of the trunk box, and the amplifying unit may be disposed in this housing part.

Moreover, the amplifying-unit housing part may be provided next to the audio device housing part in such a way that the amplifying unit is disposed directly below the maintenance lid. In this case, since the audio device controller and the amplifying unit are disposed below the maintenance lid, the maintenance of the audio device controller and the amplifying unit can be performed by simply opening the maintenance lid.

According to the embodiment of the present invention, a trunk is provided in a rear portion of a vehicle body, above a rear wheel, a navigation controller of the navigation device is disposed in the trunk at a position on a side surface close to a back surface of a passenger seat, the audio device operation part is provided near a handlebar, and the audio device controller is disposed in an audio device housing part provided at a position lower than a bottom plate of the trunk. In other words, while the operation of the operation part of the audio device is kept easy, the audio device housing part is disposed in an open space between the bottom plate of the trunk and the rear wheel. By effectively using the open space, the audio device can be disposed at the optimum position without the need for making consideration on interference of the audio device with other components.

Moreover, the audio device controller is disposed in the audio device housing part in the vehicle body rear portion. Thus, fewer devices are disposed in the vehicle body front portion, compared to a case where the audio device controller is disposed at a position in the vehicle body front portion which includes the meters and the like. Thus, the weight balance of the entire motorcycle is improved.

In addition, the navigation controller is disposed in the trunk, and the audio device controller is disposed in the audio device housing part provided at the position lower than the bottom plate of the trunk. Accordingly, there is no need to consider of making the cases of the navigation controller and the audio device controller waterproof. In addition, there is no need to consider of making harnesses and connectors to be connected to the navigation controller and the audio device controller waterproof. Accordingly, the cost of the information providing system can be reduced compared to that of a case where the navigation controller and the audio device controller are made waterproof.

Moreover, since the navigation controller is disposed in the trunk and the audio device controller is disposed in the audio device housing part, the navigation controller and the audio device controller are disposed close to each other. The wire connecting the navigation controller and the audio device controller is thus made shorter and is less likely to pick up noise than the wire of the case where the audio device controller is provided in the vehicle body front portion. Thus, improvement in sound quality can be expected. In addition, no complicated wiring is necessary, and reduction in cost can be achieved.

According to the embodiment of the present invention, an independent amplifying unit is connected to the audio device controller. The audio device controller and the amplifying unit can be disposed independently from each other. Thus, freedom in arrangement of the audio device controller and the amplifying unit can be improved more than that in a case where the audio device controller and the amplifying unit are integrated.

Moreover, the amplifying unit is disposed in the amplifying-unit housing part provided in the rear fender, and is an element including a heat generating part. The heat radiation effect on the amplifying unit, however, can be expected since the amplifying-unit housing part is positioned at a rear end potion of the motorcycle which is a portion cooled relatively well by the effect of traveling wind.

According to the embodiment of the present invention, a part of the bottom plate of the trunk is an openable and closable lid which is used when the audio device receives a maintenance. The lid serves as a bottom plate supporting luggage when the luggage is loaded into the trunk, and is a member which is detached from the bottom plate of the trunk when the maintenance of the audio device is required. Since only the opening of the lid is required when the maintenance is preformed, the maintenance of the audio device can be performed easily, and the operability is further improved.

According to the embodiment of the present invention, the audio device controller is disposed at a position offset from a vehicle-width center line to any one of the right and left in a vehicle width direction, and a wire extending out from the navigation controller is extended to a side opposite to a side where the audio device controller is offset from the vehicle-width center line, and is then connected to the audio device controller. This configuration allows the main harness to be disposed on a side opposite to a side where the audio device controller is offset from the vehicle-width center line. Since the wire connecting the navigation controller and the audio device controller is disposed in such a way as to run on the main harness side, the above wire can be handled easily when the wire and the main harness are connected. Thus, the wire can be made to run easily.

According to the embodiment of the present invention, the audio device controller includes a connection part of the wire on a space side, the space formed by offsetting the audio device controller. The connection part is formed of a male connector provided on the wire, and a female connector provided on the audio device controller. Since the connection part of the wire is disposed on the space side, the space obtained by the offset arrangement of the audio device controller, the insertion and removal of the male connector can be performed more easily, and the operation efficiency is improved.

According to the embodiment of the present invention, the navigation controller and the audio device controller are connected to each other by a communication harness, and the communication harness is pulled out of the audio device housing part, and is then inserted into the trunk. If being made to penetrate through the bottom plate of the trunk, the communication harness will affect the luggage space in the trunk. In this respect, since the wire is not made to run through the bottom plate of the trunk in the embodiment of the present invention, the storage space of the trunk can be used effectively when luggage is loaded into the trunk.

According to the embodiment of the present invention, a universal serial bus connector is connected to the audio device via a connector harness, and the universal serial bus connector is disposed in the trunk. Since an electronic apparatus such as a digital audio player and a CD player can be connected to the universal serial bus connector, the audio device can be functionally expanded. Accordingly, the audio device can be made more entertaining and easier to operate for users.

According to the embodiment of the present invention, a connection port of the universal serial bus connector is attached to a protection cover integral with an attachment portion attached to the inside of the trunk. When the trunk is opened, rain water or dust may enter the connection port of the connector if a cover or a cap is not attached to the connection port of the universal serial bus connector. In the embodiment of the present invention, on the other hand, since the protection cover is attached to the connection port of the universal serial bus connector, a waterproofness and a dust-proofness are secured even when the trunk is opened.

The information providing system according to the embodiment of the present invention is suitable for a motorcycle.

Obviously, numerous modifications and variations of the present invention are possible in light of the above teachings. It is therefore to be understood that within the scope of the appended claims, the invention may be practiced otherwise than as specifically described herein.

What is claimed is:

1. An information providing system of a motorcycle, comprising:
    a navigation device comprising:
        a navigation controller disposed in a trunk on a side surface of the trunk close to a back surface of a passenger seat, the trunk being provided in a rear portion of a vehicle body of the motorcycle and above a rear wheel of the motorcycle; and
    an audio device comprising:
        an audio device operation part provided in a vicinity of a handlebar of the motorcycle; and
        an audio device controller disposed in an audio device housing provided at a position lower than a bottom plate of the trunk, the audio device housing downwardly protrudes from a lower surface of the bottom plate,
    wherein the bottom plate includes an opening through which an interior space of the audio device housing is connected to an interior space of the trunk, and
    wherein the bottom plate includes a lid configured to be movably provided over the opening to open and close the opening.

2. The information providing system of the motorcycle according to claim 1,
    wherein the audio device includes an amplifying part connected to the audio device controller, and
    wherein the amplifying part is disposed in an amplifying-unit housing disposed below the audio device controller and provided in a rear fender of the motorcycle.

3. The information providing system of the motorcycle according to claim 2,
    wherein the audio device controller is disposed at a position offset from a vehicle-width center line to any one of right and left in a vehicle width direction of the motorcycle, and
    wherein a wire extending out from the navigation controller is extended to a side opposite to a side where the audio device controller is offset from the vehicle-width center line, and is then connected to the audio device controller.

4. The information providing system of the motorcycle according to claim 3,
    wherein the audio device controller includes a connection part of the wire provided on a side of a space, the space being formed by offsetting the audio device controller.

5. The information providing system of the motorcycle according to claim 3,
    wherein the navigation controller and the audio device controller are connected to each other by a communication harness, and
    wherein the communication harness is pulled out of the audio device housing, and is then inserted into the trunk.

6. The information providing system of the motorcycle according to claim 1,
    wherein a universal serial bus connector is connected to the audio device via a connector harness, and
    wherein the universal serial bus connector is disposed in the trunk.

7. The information providing system of the motorcycle according to claim 6,
    wherein a connection port of the universal serial bus connector is attached to a protection cover integral with an attachment portion attached to an inside of the trunk.

8. A motorcycle comprising:
    a front wheel;
    a rear wheel;
    a vehicle body including a handlebar, a passenger seat, and a trunk, the trunk being provided in a rear portion of the vehicle body and above the rear wheel; and
    an information providing system comprising:
        a navigation device comprising:
            a navigation controller disposed in the trunk on a side surface of the trunk close to a back surface of the passenger seat; and
        an audio device comprising:
            an audio device operation part provided in a vicinity of the handlebar; and an audio device controller disposed in an audio device housing provided at a position lower than a bottom plate of the trunk, the audio device housing downwardly protrudes from a lower surface of the bottom plate, wherein the bottom plate includes an opening through which an interior space of the audio device housing is connected to an interior space of the trunk, and wherein the bottom plate includes a lid configured to be movably provided over the opening to open and close the opening.

9. The motorcycle according to claim 8, wherein the audio device includes an amplifying part connected to the audio device controller, and wherein the amplifying part is disposed in an amplifying-unit housing disposed below the audio device controller and provided in a rear fender of the motorcycle.

10. The motorcycle according to claim 9, wherein the audio device controller is disposed at a position offset from a vehicle-width center line to any one of right and left in a vehicle width direction of the motorcycle, and wherein a wire extending out from the navigation controller is extended to a side opposite to a side where the audio device controller is offset from the vehicle-width center line, and is then connected to the audio device controller.

11. The motorcycle according to claim 10, wherein the audio device controller includes a connection part of the wire provided on a side of a space, the space being formed by offsetting the audio device controller.

12. The motorcycle according to claim 10, wherein the navigation controller and the audio device controller are connected to each other by a communication harness, and wherein the communication harness is pulled out of the audio device housing, and is then inserted into the trunk.

13. The motorcycle according to claim 8, wherein a universal serial bus connector is connected to the audio device via a connector harness, and wherein the universal serial bus connector is disposed in the trunk.

14. The motorcycle according to claim 13, wherein a connection port of the universal serial bus connector is attached to a protection cover integral with an attachment portion attached to an inside of the trunk.

* * * * *